United States Patent [19]

Olson

[11] Patent Number: 4,944,476
[45] Date of Patent: Jul. 31, 1990

[54] GROUND STAKE FOR RETAINING IRRIGATION CONDUIT

[76] Inventor: Donald O. Olson, 1935 Atlozana Dr., El Cajon, Calif. 92020

[21] Appl. No.: 285,550

[22] Filed: Dec. 16, 1988

[51] Int. Cl.⁵ .............................................. A47G 29/00
[52] U.S. Cl. ...................................... 248/87; 239/276
[58] Field of Search .................... 248/87, 156, 85, 86, 248/88, 75; 239/276, 285, DIG. 1; 138/106, 105

[56] References Cited

U.S. PATENT DOCUMENTS

| | | | |
|---|---|---|---|
| 2,425,893 | 8/1947 | Molitor | 248/87 |
| 2,536,341 | 1/1951 | Asher | 248/87 |
| 3,788,552 | 1/1974 | Roberts | 239/276 |
| 3,941,342 | 3/1976 | Bradshaw | 248/88 |
| 3,994,441 | 11/1976 | Testa | 138/106 |
| 4,135,668 | 1/1979 | Winkler et al. | 239/276 |
| 4,440,370 | 4/1984 | Rood | 248/75 |
| 4,801,089 | 1/1989 | Zeman | 239/276 |

Primary Examiner—J. Franklin Foss

[57] ABSTRACT

A one-piece stabilizing stake adapted to be placed in a preselected ground area for retaining a flexible irrigation conduit. The stake has an elongated body with an upper portion for holding the conduit and an integral lower portion adapted to be driven into the ground. The upper stake portion has first conduit gripping members for holding the conduit end portion in a generally upright, vertical position and a second conduit gripping member on said body extending generally transverse on the body for holding the conduit substantially parallel to the ground area.

10 Claims, 2 Drawing Sheets

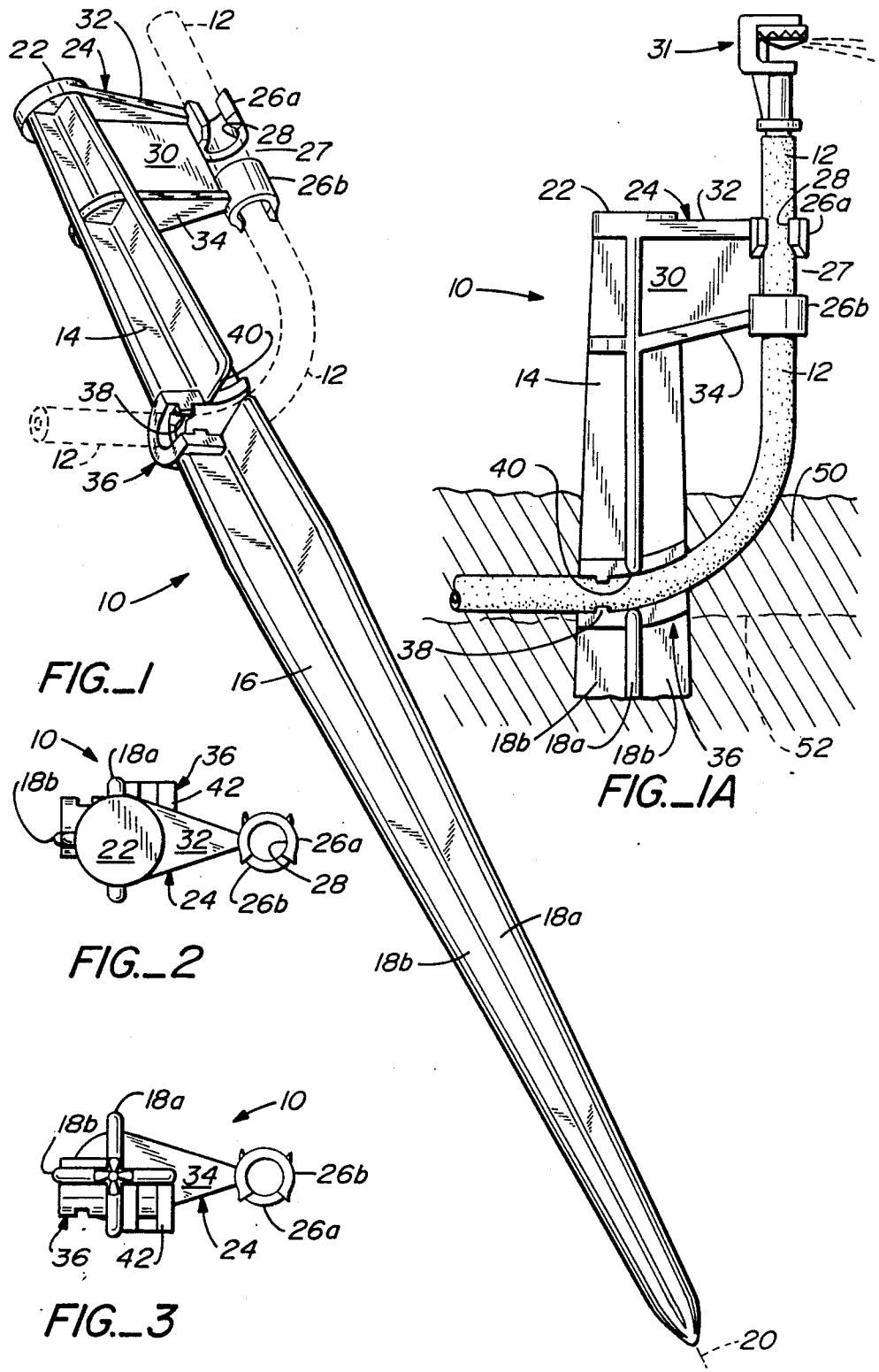

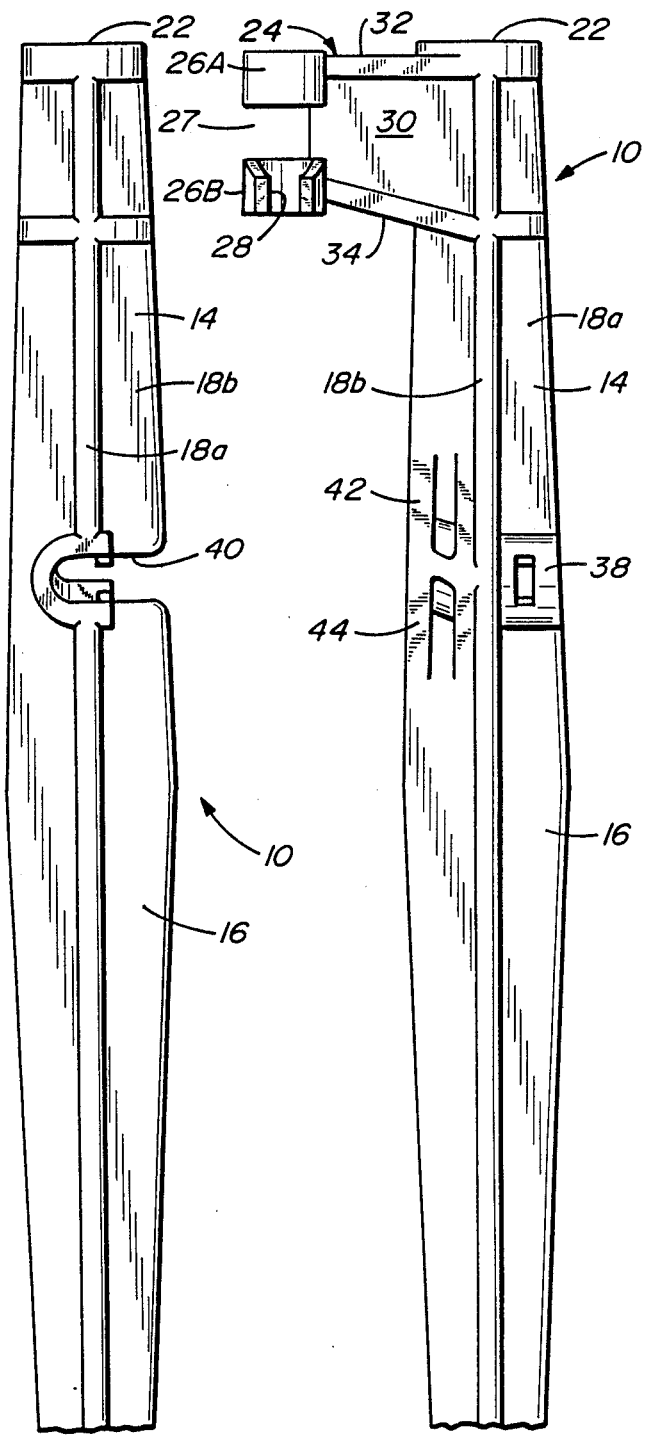
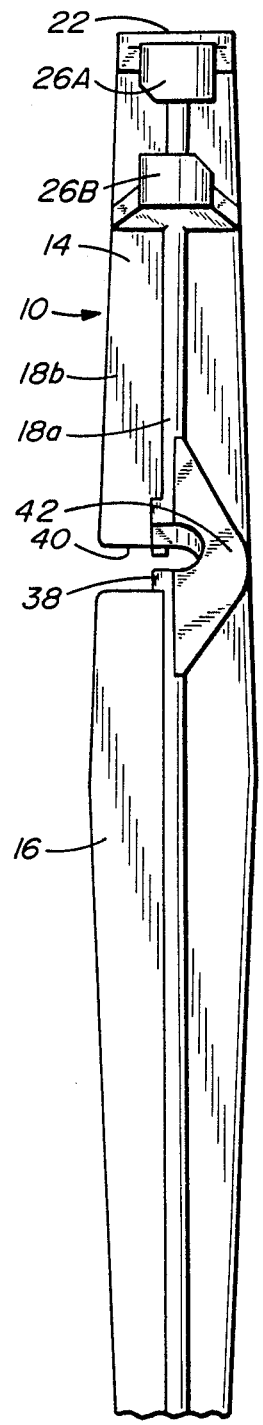
FIG._4  FIG._5  FIG._6

GROUND STAKE FOR RETAINING IRRIGATION CONDUIT

This invention relates to irrigation systems comprised of water carrying conduit networks and more particularly to a stake for retaining a conduit section and its dispensing end element above or slightly below ground level.

Background of the Invention

Drip irrigation systems and other low flow rate irrigation systems whether large or small are generally comprised of a plurality of water carrying conduits extending from a main branch pipe connected to the water source. Such conduits, which are normally made of plastic material (e.g. PVC) may lie on the ground or, where greater protection is required, just under the ground surface. For many applications the end of the conduit must be retained above ground level so that it can be connected to a small water dispensing device such as a spray nozzle or the like. Since the plastic conduit material has a tendency to twist and curl when installed, it is necessary to hold the conduit in a manner that will permit its end dispenser to be positioned properly near a plant that requires watering and yet securely so that the conduit cannot be twisted and thereby change its present watering pattern and also cannot be easily disconnected from the stake by some extraneous force.

A general object of the present invention is to solve the aforesaid problem by providing a stabilizing stake which can be forced into the ground adjacent an area to be irrigated and also will connect with and retain a conduit at two locations so that a conduit portion near its end will be positioned at a preselected location above ground and another portion spaced further from its end will be held near to or just below the ground surface.

Summary of the Invention

In accordance with the principles of the invention a conduit retaining stake is provided which is molded as a one-piece unit from a suitable plastic material. In general, the stake has an upper body portion with an integral end cap which provides a means for absorbing an impact force used to drive the stake into the ground. The upper body portion is integral with a tapered lower body portion both of which are comprised of four elongated fin members that extend outwardly from the axial centerline of the stake. Near the end cap of the upper body portion is an outwardly extending area that supports a substantially vertical conduit gripping element. Below the end cap and substantially between the upper and lower body members is a transverse or horizontal conduit gripping element. The vertical gripping element will hold a conduit above the ground level and also position the end of the conduit (normally having a sprinkler device attached thereto) so as to water an adjacent plant. The vertical gripping element is used either with or without the horizontal gripping element to hold the end of the conduit generally 90 degrees to the ground surface. Thus, the stake serves to stabilize and retain the sprinkler end of a conduit in a vertical position, i.e. 90 degrees to the ground surface and also to force the conduit to lie flat upon or just below the ground surface where it is less likely to be damaged by field workers.

Other objects, advantages and features of the invention will become apparent from the following detailed description of a preferred embodiment thereof taken in conjunction with the accompanying drawings.

BRIEF DESCRIPTION OF THE DRAWING

FIG. 1 is a view in perspective of a conduit supporting ground stake according to the invention.

FIG. 1A is a fragmentary view in front elevation of the ground stake shown in FIG. 1.

FIG. 2 is a top view of the stake shown in FIG. 1.

FIG. 3 is a bottom view of the stake shown in FIG. 1.

FIG. 4 is a fragmentary view in left side elevation of the stake shown in FIG. 1.

FIG. 5 is a fragmentary view in rear elevation of the stake shown in FIG. 1.

FIG. 6 is a fragmentary view in right side elevation of the stake shown in FIG. 1.

BRIEF DESCRIPTION OF EMBODIMENT

With reference to the drawing, FIG. 1 shows a ground stake 10 embodying principles of the present invention, which is adapted to be forced into the ground to provide a retaining means for a fluid conduit 12, indicated by dotted lines in the drawing. The conduit 12 is connected to a water supply source (not shown) and may be part of an irrigation system which includes a plurality of such conduits.

In general, the stake 10 comprises a one-piece unit preferably molded from a suitable plastic material, (e.g. polypropylene). As shown in FIG. 1, the stake has an upper portion 14 and an elongated lower portion 16. In cross section both upper and lower portions are comprised of crossing fin members 18a and 18b that extend radially from along the axial centerline 20 of the stake and are spaced 90 apart. (See FIG. 5) These fins taper longitudinally to a smaller width at the lower end of the stake. They provide adequate bending strength to the stake and low resistance to ground penetration, thereby enabling it to be easily forced into soil, even if it is severely compacted.

The upper portion 14 of the stake has an integral cap member 22 which enables the stake to be impacted by an appropriate tool to force the stake into the ground. Just below the cap member 22 is an outwardly extending bracket 24 for the conduit 12. The gripping element comprises a pair of relatively short vertically aligned sleeve-like members 26a and 26b separated by a space 27. In a typical stake embodiment the length of the space 27 is around 0.35 inches and is shorter than the length (e.g. 5 inches) of the members 26a and 26b. Each sleeve-like member has a circular cross-section and a centerline 20 that is substantially parallel to the longitudinal centerline 20 of the stake. Each member 26a and 26b also has an elongated opening 28 provided along its length in order to enable the insertion of the conduit. The opening 28 in the two vertically aligned elements are 180 apart and thus face in opposite directions. Thus, when the conduit 12 is placed within both aligned members 26a and 26b any extraneous side force cannot inadvertently dislodge the conduit from both members and it will remain firmly in position.

The supporting bracket 24 for the element 26 comprises an extended portion 30 of one fin 18b and a pair of upper and lower triangular members 32 and 34. These triangular members extend from the transverse fin 18a along the upper and lower edges of the extended portion 30 and are attached along one side of the element 26. The element 26 holds the end portion of the conduit 12 in substantially a vertical position so that a miniature sprinkler device 31 or some other suitable water dispensing element can be attached to the conduit and directed in a desired manner toward a plant being irrigated.

In order to hold and stabilize the conduit 12 below the upper element 26 a second conduit retaining means 36 is provided on the stake body itself substantially at the junction of its upper and lower portions 14 and 16. This conduit retaining means 36 comprises an open channel member 38 that extends transverse to the longitudinal axis of the stake and through at least a portion of its fin members 18a and 18b.

As seen in the front elevational view of FIG. 1A, the channel member 38 has an inlet portion on the left side of a fin member 18a that is essentially perpendicular thereto. On the right side of fin member 18a, an outlet portion of the channel member 38 curves upwardly to a slight degree. This enables the conduit 12 within the channel member to curve upwardly so that it can fit within the gripping element 26 without being kinked or sharply bent.

As shown in FIG. 4, the channel member 38 extends through an open notch 40 in one fin member 18a and across the other fin member 18b that is at right angles to it. On the outer end of the outlet portion of the channel member 38 as shown in FIGS. 5 and 6 is an integral flange 42 which is connected by a web 44 to the rear edge of the fin member 18a, thereby providing additional strength to the channel 38 at this location. The walls of the transverse channel member 38 are formed with approximately the same thickness as the fin members 18a and 18b so as to provide ample strength to the stake at the junction of its upper and lower portions.

Within the inlet portion of the transverse channel member 38 are a pair of small projections 46 attached to the opposite outer edges 48 of the channel 38 and extending inwardly towards each other. These projections 46 serve to retain the conduit 12 within the channel 38 once the conduit is pressed into it.

As indicated in FIG. 1A, the stake 10 can be forced into the ground 50 to any suitable depth depending on the plant to be irrigated, the prevailing soil conditions and also whether it is desired to maintain the conduit 12 above or just below the ground surface. In FIG. 1A, the conduit is shown when the channel member 38 holds it below the ground surface, and a broken line 52 indicates a possible ground level ground the stake 10 if the conduit is to be situated above the ground. In either application, the conduit is easily attached to the stake 10 by pressing it into the transverse channel member 38 and the upright gripping elements 26a and 26b. The stake can then be pressed or pounded into the soil at a desired location. Once in place, the stake 10 will hold the conduit firmly in position for an extended use period without kinking or over stressing the conduit.

The preferred embodiment described herein is intended to be purely illustrative, and not limiting of the scope of the invention. Other embodiments and variations will be apparent to those skilled in the art and may be made without departing from the essence and scope of the invention as defined in the following claims.

What is claimed is:

1. A stabilizing stake adapted to be placed in a preselected ground area for retaining a flexible irrigation conduit, said stake comprising:
    an elongated body having an upper portion and an integral lower portion with a longitudinal centerline extending through said portions;
    a first integral conduit gripping means attached to and supported by said upper body portion for holding an end portion of said conduit in a generally upright position and for preventing it from rotating; and
    a second integral conduit gripping means on said body extending generally transverse to its said centerline and located below said first gripping means, said second gripping means including an open channel with spaced apart opposite edges for further holding the conduit retained by said first gripping means so that the conduit will remain in a position substantially parallel to said ground area.

2. The stabilizing stake as described in claim 1 wherein first conduit gripping means comprises an arm attached to said upper body portion and extending to one side thereof, and a pair of spaced apart open sleeve members having a generally circular cross-section, said members each having an elongated opening for receiving said conduit with an interference fit, said elongated openings being angularly displaced from each other so that they are not in vertical alignment.

3. The stabilizing stake as described in claim 2 wherein said elongated openings of said sleeve members are angularly spaced apart by about 180 degrees so that they face in opposite directions.

4. The stabilizing stake as described in claim 1 wherein said elongated body comprises a plurality of fin members projecting radially from said centerline and extending to a lower tip of said body.

5. The stabilizing stake as described in claim 4 wherein said fin members in cross-section are 90 apart and extend into both said upper and lower body portions.

6. The stabilizing stake as described in claim 1 wherein all elements of said stake are formed integrally from molded plastic material.

7. The stabilizing stake as described in claim 5 wherein said second conduit gripping means comprises an open channel member which extends transversely through all of said fin members.

8. The stabilizing stake as described in claim 7 wherein said channel member is located substantially at the junction of said upper and lower body portions.

9. The stabilizing stake as described in claim wherein said channel member has an inlet portion on one side of one transverse fin member which is substantially straight and horizontal and a connecting outlet portion of said channel member on the other side of said transverse fin member that curves slightly upwardly, thereby directing said conduit in a smooth curve toward said first gripping means.

10. The stabilizing stake as described in claim 1 including a plurality of projections extending inwardly from said opposite edges of said open channel forming said second gripping means.

* * * * *